Jan. 5, 1932.   W. L. BODMAN   1,839,914

HEAT INSULATING BLOCK

Filed July 28, 1926

INVENTOR.
Walter Light Bodman,
BY Ramsey Hoguet
ATTORNEY

Patented Jan. 5, 1932

1,839,914

UNITED STATES PATENT OFFICE

WALTER LIGHT BODMAN, OF NEW YORK, N. Y.

HEAT INSULATING BLOCK

Application filed July 28, 1926. Serial No. 125,469.

My invention relates to improvements in heat insulating blocks, and the object of my invention is to produce a cheap, simple, and yet unusually strong block which affords a permanent container for a heavy insulating gas, and which is of such shape that it can be laid readily in a wall after the manner of laying brick, tile, or the like.

My invention is also intended to produce a block which can be made of cheap common materials, and yet be very strong, and which affords a simple and reliable means of retaining the insulating gas with which it is filled.

Reference is to be had to the accompanying drawings forming a part of this specification, in which similar reference characters indicate corresponding parts in all the views.

Figure 1:
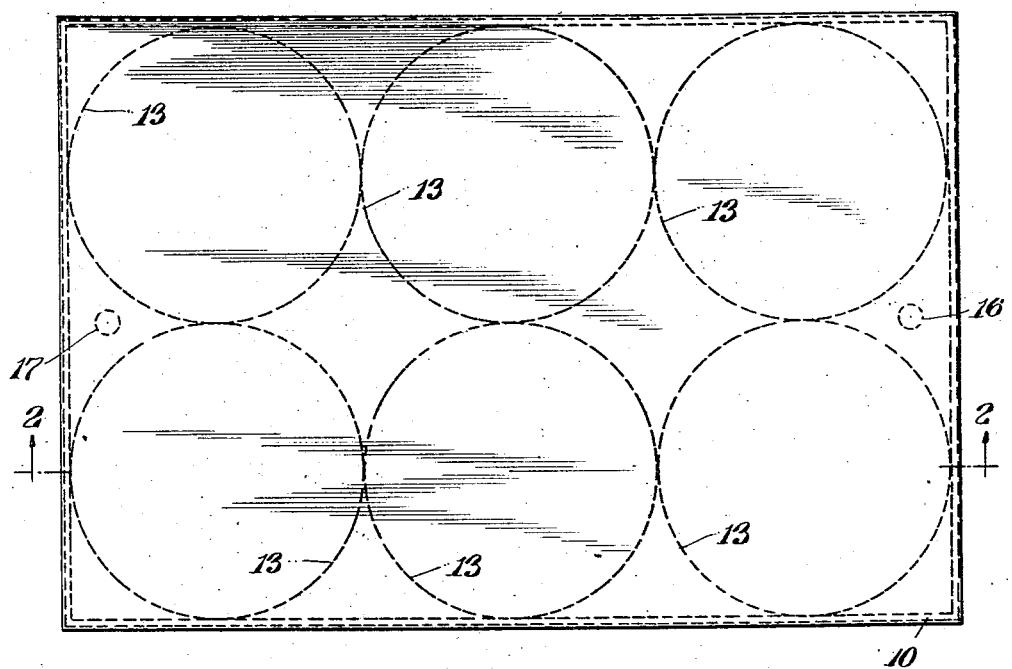
Figure 1 is a face view of a block embodying my invention.
Figure 2:
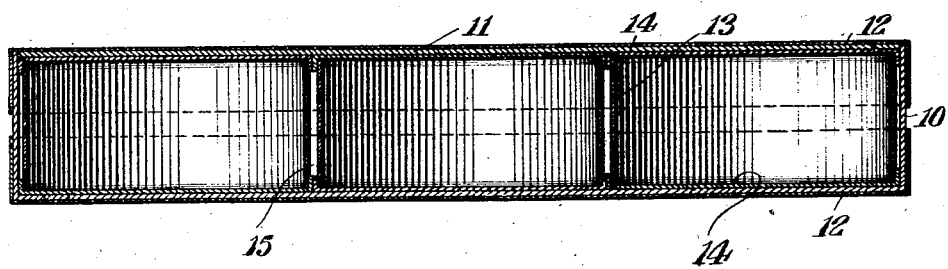
Figure 2 is a cross section on the line 2—2 of Figure 1.

In carrying out my invention I employ preferably a cheap box which can be of rectangular shape, is rendered impervious to water, air and gas, and contains a carton preferably cylindrical in shape which can if desired be filled with insulating gas, and which besides serving as a gas container, acts to cheaply and very efficiently brace the block so as to make it unusually strong. For example a box 10 of fibre, pasteboard, or of any approved material can be used, this being preferably rectangular in shape and having a cover 11 which fits nicely over the open side of the box. The material of the box can be treated in any of the usual or preferred ways to make it water-proof and air and gas tight, and as a means to this end the box is preferably covered with a lead foil 12 which overlies the corners and the greater part of the edges of the box, the adjacent parts of the foil covering being separated for better insulation. This foil can be intimately incorporated with the material of the box so that it will remain in place and will effectually seal it. Within the box I place transversely rows of cartons 13 which fill the box except for the spaces intervening between cartons, and these have preferably covers 14 which overlap the ends and afford a better means of separation. The cover portions will meet on the adjacent cartons as in Figure 2, leaving a space between them for the circulation of the insulating gas with which the block or box is filled. These cartons are preferably treated to make them water, gas and air tight, and they are preferably themselves filled with an insulating gas, for example carbon dioxide, and as the box itself is filled with such a gas, it will be seen that the block as a whole affords almost perfect insulation.

The box can be filled with gas in any convenient way. For example it is provided with holes 16 and 17 near opposite sides, and the gas is let in through one hole and the air expelled through the other, after which the holes are sealed. The air can be forced out by the inflowing gas, or the air may be exhausted if preferred.

It will be seen that the structure which I have described is a very simple and inexpensive one, and that it affords a block which can be laid up like ordinary tile or cement, and the several blocks can be cemented together if desired, while they may form the inner lining between two walls, thus making the whole wall very strong and practically proof against the transmission of heat through it.

The most convenient shape to make these blocks is rectangular, as they can be laid to better advantage, but I do not limit the invention to any particular shape. Obviously the cylindrical cartons might be built up in the wall, but this would be far less convenient than to incorporate them in a box forming a block carrying the insulating medium and the strengthening cartons as described.

For some purposes where only moderate insulation is required, a block comprising the box and its bracing cartons may be used without the gas filler, and in such case it affords a cheap, strong block suitable for many uses.

I claim:—

1. A heat insulating block comprising a rectangular box and cover therefor, said box and cover being formed of cellulosic waterproof material, a covering of lead foil overlying the corners of the box and the greater part of the edges thereof, adjacent parts of the foil being separated, a plurality of cylindrical cartons in the box arranged in spaced relationship, each carton having covers overlapping the ends of the carton, said cartons being impervious to gas and water and filled with a heavier than air insulating, fire-resisting gas.

2. A heat insulating block comprising a rectangular box and cover therefor, said box and cover being formed of cellulosic waterproof material, and moisture and gas tight, a covering of lead foil overlying the corners of the box and the greater part of the edges thereof, adjacent parts of the foil being separated, a plurality of cylindrical cartons in the box arranged in spaced relationship, each carton having covers overlapping the ends of the carton, said cartons being impervious to gas and water and filled with a heavier than air insulating, fire-resisting gas, the body of said box being likewise filled with the same gas.

In testimony whereof, I have signed my name to this specification this 27th day of July, 1926.

WALTER LIGHT BODMAN.